(12) United States Patent
Harmon et al.

(10) Patent No.: US 10,921,099 B2
(45) Date of Patent: Feb. 16, 2021

(54) SINGLE-HAND OPERABLE CLAMPING MECHANISM

(71) Applicant: Action Target Inc., Provo, UT (US)

(72) Inventors: James Harmon, Nephi, UT (US); Robert Decosta, Spanish Fork, UT (US)

(73) Assignee: Action Target Inc., Provo, UT (US)

( * ) Notice: Subject to any disclaimer, the term of this patent is extended or adjusted under 35 U.S.C. 154(b) by 21 days.

(21) Appl. No.: 16/234,504

(22) Filed: Dec. 27, 2018

(65) Prior Publication Data

US 2019/0219369 A1 Jul. 18, 2019

Related U.S. Application Data

(60) Provisional application No. 62/617,179, filed on Jan. 13, 2018.

(51) Int. Cl.
*F41J 1/10* (2006.01)
*F16B 2/10* (2006.01)

(52) U.S. Cl.
CPC .. *F41J 1/10* (2013.01); *F16B 2/10* (2013.01)

(58) Field of Classification Search
CPC .................. F41J 1/10; F41J 1/00; F16B 2/10
USPC ........................................................ 273/407
See application file for complete search history.

(56) References Cited

U.S. PATENT DOCUMENTS

| | | | | |
|---|---|---|---|---|
| 3,593,386 | A | * | 7/1971 | Hug ................... A47G 25/0607 24/457 |
| 3,950,829 | A | * | 4/1976 | Cohen ..................... D06F 55/02 211/124 |
| 4,492,005 | A | | 1/1985 | Begley et al. |
| 5,067,683 | A | * | 11/1991 | Wager ........................ F41J 1/10 248/545 |
| 5,549,208 | A | | 8/1996 | Yurga |
| 8,016,278 | B2 | | 9/2011 | Dixon |
| 8,387,963 | B2 | | 3/2013 | Moutafis |
| 2016/0333908 | A1 | * | 11/2016 | Burnett ................... F16B 2/185 |
| 2019/0145172 | A1 | * | 5/2019 | Parker ....................... E06C 1/34 182/107 |

FOREIGN PATENT DOCUMENTS

DE 299 15 933 U1 12/2000

* cited by examiner

*Primary Examiner* — John E Simms, Jr.
*Assistant Examiner* — Rayshun K Peng
(74) *Attorney, Agent, or Firm* — Bateman IP

(57) ABSTRACT

A clamping system and method for allowing one-handed operation of a target clamp is described. The clamp may also be designed to be concealed and/or behind a structure such that portions of the clamp are not exposed to projectiles, thus protecting the clamp from sustaining damage.

12 Claims, 18 Drawing Sheets

SINGLE-HAND OPERABLE CLAMPING MECHANISM

TECHNICAL FIELD

The present invention relates generally to a clamp for holding targets. More specifically, the present invention relates to a target holding clamp which may be more easily opened and closed.

BACKGROUND

In order to maintain efficiency with the use of firearms, it is important to frequently train. In range shooting, it is important to provide multiple different scenarios to train a shooter (often a soldier or law enforcement officer) to react properly in a number of different situations—thereby protecting both the trainee and the public at large. Often, training will occur at a shooting range wherein a target is held in front of a bullet containment system, such as a bullet trap.

Many shooting scenarios involve a target which is moving. For example, the target may be attached to a retriever which moves toward and away from a shooter. One scenario might be a target which is initially stationary and then which advances quickly toward a law enforcement officer who must recognize whether the image on the target indicates a threat and, if so, must accurately discharge the weapon before the target reaches a predetermined point. In other shooting environments a target may move side to side or may rotate from a position in which a target is generally parallel to the line of fire or rotates 90 degrees, so as to be presented to the shooter. In this last scenario, the shooter must usually determine if the target presents a threat and fire, if necessary, before the target returns to the initial non-presented position.

Regardless of what scenarios are being presented, it is important that the target be held securely. Air resistance and inertia can cause the target to flex or otherwise become distorted. Additionally, the target may be moving at high rates of speed.

Many clamps have been developed to hold shooting targets and/or target backers so as to prevent the targets from becoming loose during a training session. Such clamps, however, are often somewhat cumbersome to use. Conventional clamps frequently require the person loading the target to use both hands to attach the target into the clamp. This usually means that the person mounting the target must place other targets for other lanes on the floor while mounting each target. Because bullets are most commonly made with lead, the floor of a shooting range may be covered with lead dust, and repeatedly placing targets on the ground and then lifting the targets back up risks making the lead airborne and potentially injuring the health of the person mounting the targets. Additionally, having to repeatedly replace a stack of targets on the ground while moving along on a range which could have dozens of lanes is cumbersome and time consuming.

Furthermore, many clamps previously designed left the hardware of the clamp exposed. Thus, stray shots could potentially damage the clamp, causing either permanent damage to the clamp, rendering the clamp inoperable, causing the clamp to drop the target, and/or causing dangerous splatter/ricochets.

Thus, there is a need for a target clamp which is easy to use and which securely holds a target to a target-presenting system.

SUMMARY OF INVENTION

A target clamp may include a target engagement face which moves between a first, open position, and a second, closed position, with one-hand operation and/or a simple application of force on the target.

In accordance with one aspect of the invention, the target clamp includes a biasing member which biases the target engagement face into the first, open position, or the second, closed position, depending on the location of the target engagement face. This allows the target engagement face to be held in the first, open position, when not in use and in the second, closed position, when in use to securely hold the target. This allows for single-handling of operation, or movement between the open and closed position by simply applying selective force to the target and/or target engagement face.

In accordance with one aspect of the invention, the target engagement face is connected to a mounting frame which includes a pivot. The pivot may allow the target engagement face to pivot between the first, open position, and the second, closed position.

In accordance with another aspect of the invention, the biasing element is attached to the mounting frame in a manner as to apply a biasing force on either side of the pivot. Thus, when the target engagement face is disposed in the first, open position, the biasing element biases the target engagement face in the first, open position. When the target engagement face is in the second, closed position, the biasing element biases the target engagement face into the second, closed position.

In accordance with another aspect of the invention, the target engagement face may have one or more channels through which the biasing element passes so as to allow the biasing element to engage the mounting frame, all without interference by the target engagement face.

In accordance with another aspect of the invention, the mounting frame may include an engagement member for receiving or attaching to a biasing element.

In accordance with another aspect of the invention, the biasing element may be a spring, an elastic member, or a shape memory biasing element.

In accordance with another aspect of the invention, the target engagement face may include one or more projections for engaging targets.

In accordance with another aspect of the invention, the biasing element may engage the mounting frame so that the application of force generally perpendicular to the biasing element and/or generally parallel to the movement of the target engagement face between the first, open position, and the second, closed position, opens and closes the target engagement face while applications of force in other directions does not.

In accordance with another aspect of the invention, the target clamp may be used on a retriever, a runner, or a turn actuator to securely hold the target.

BRIEF DESCRIPTION OF DRAWINGS

The following drawings illustrate what are currently considered to be specific representative configurations for carrying out the invention and are not limiting as to embodiments which may be made in accordance with the present invention. The components in the drawings are not necessarily to scale relative to each other. Like reference numerals designate corresponding parts throughout the several views.

The drawings are illustrative and not limiting of the scope of the invention which is defined by the appended claims. The various elements of the invention accomplish various aspects and objects of the invention. Not every element of the invention can be clearly displayed in a single drawing, and as such not every drawing shows each element of the invention.

DETAILED DESCRIPTION

Figure 1:
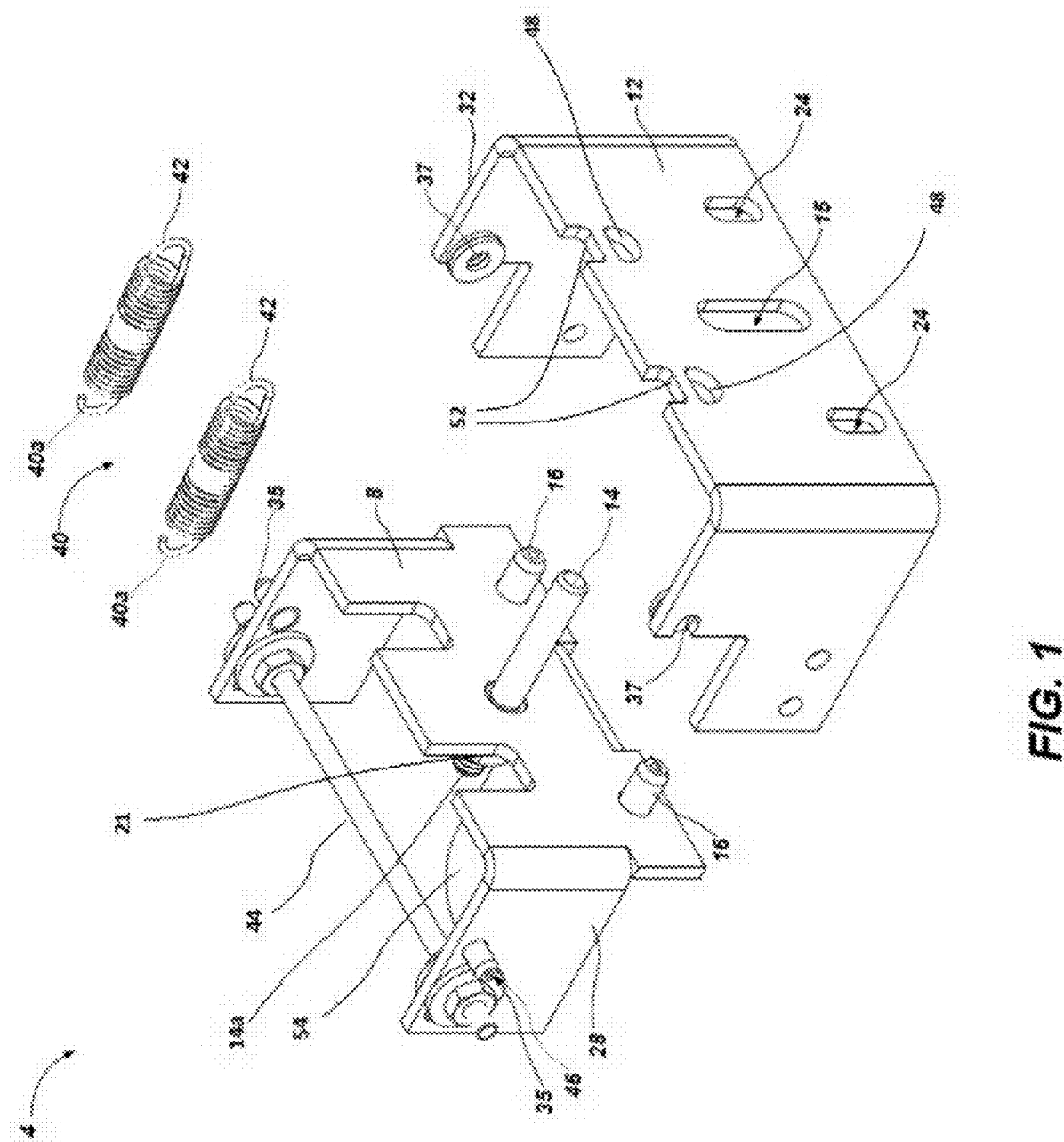
FIG. 1 shows a perspective, exploded view of a target clamp made in accordance with principles of the present invention.

The following provides a detailed description of particular embodiments of the present invention. Reference will now be made to the drawings in which the various elements of the illustrated configurations will be given numerical designations and in which the invention will be discussed so as to enable one skilled in the art to make and use the invention. It is to be understood that the following description is only exemplary of the principles of the present invention, and should not be viewed as narrowing the scope of the claims which follow, which claims define the full scope of the invention.

It will be appreciated that various aspects discussed in one drawing may be present and/or used in conjunction with the embodiment shown in another drawing, and each element shown in multiple drawings may be discussed only once. For example, in some cases, detailed description of well-known items or repeated description of substantially the same configurations may be omitted. The reason is to facilitate the understanding of those skilled in the art by avoiding the following description from being unnecessarily redundant. The accompanying drawings and the following description are provided in order for those skilled in the art to fully understand the present disclosure, and these are not intended to limit the scope of claims.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Reference in the specification to "one configuration" "one embodiment," "a configuration" or "an embodiment" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" in various places may not necessarily limit the inclusion of a particular element of the invention to a single configuration, rather the element may be included in other or all configurations discussed herein.

Furthermore, the described features, structures, or characteristics of configurations of the invention may be combined in any suitable manner in one or more configurations. In the following description, numerous specific details are provided, such as examples of products or manufacturing techniques that may be used, to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

Before the present invention is disclosed and described in detail, it should be understood that the present disclosure is not limited to any particular structures, process steps, or materials discussed or disclosed herein, but is extended to include equivalents thereof as would be recognized by those of ordinary skill in the relevant art. More specifically, the invention is defined by the terms set forth in the claims. It should also be understood that terminology contained herein is used for the purpose of describing particular aspects of the invention only and is not intended to limit the invention to the aspects or configurations shown unless expressly indicated as such. Likewise, the discussion of any particular aspect of the invention is not to be understood as a requirement that such aspect is required to be present apart from an express inclusion of the aspect in the claims.

It should also be noted that, as used in this specification and the appended claims, singular forms such as "a," "an,"

and "the" may include the plural unless the context clearly dictates otherwise. Thus, for example, reference to "a spring" may include one or more of such springs, and reference to "the retainer" may include reference to one or more of such retainers.

As used herein, the term "substantially" refers to the complete or nearly complete extent or degree of an action, characteristic, property, state, structure, item, or result to function as indicated. For example, an object, such as the clamping mechanism, that is "substantially" enclosed would mean that the object is either completely enclosed or nearly completely enclosed. The exact allowable degree of deviation from absolute completeness may in some cases depend on the specific context, such that enclosing nearly all of the clamp would be substantially enclosed, even if the distal end of the structure enclosing the clamp had a slit or opening formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it lacked a bottom.

As used herein the term "generally" refers to something that is more of the designated adjective than not, or the converse if used in the negative. For example, something maybe said to be generally circular even though it has a somewhat oval shape or is polygonal rather than being completely smooth.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The present invention generally relates to a clamping system including a clamping mechanism that allows a target and/or target backer board to be installed and/or removed with one hand, and also protects the structure of the clamping mechanism from any stray rounds. As used herein, the term "target" is used to refer to any type of target and/or target backer board at which a projectile is fired or launched.

One particular embodiment of the present invention is shown and described in a target clamp of FIG. 1. FIG. 1 shows an exploded, perspective view of a target clamp, generally indicated at 4, made in accordance with principals of the present invention. The target clamp 4 may include a target engagement face 8, which holds a target against a retainer 12. It will be appreciated that the target engagement face 8 may comprise an elongate flat structure, such as a piece of steel. However, there is no requirement the target engagement face 8 be a continuous piece of metal or other material so long as it engages a target sufficiently to secure the target against the retainer 12.

The target engagement face 8 may be provided with an arm, rod or projection which forms an extension 14 (such as a post or a stud) which can be used as a handle and/or function as a rotation limiting device. The extension 14 may extend outwardly from the target engagement face and may be secured to the target engagement face by one or more screws 21 (FIG. 2) disposed near one end 14a (FIG. 2) of the extension. In FIG. 1, the extension 14 is shown extending at an angle of approximately ninety degrees, though other angles could be used. The extension 14 may extend through a recess or opening 15 in the retainer 12. The extension 14 may be designed to engage a top edge of a target, such that when the top edge of the target pushes upwardly against the extension 14, the target engagement face 8 moves from a first, open position relative to the retainer 12, to a second, closed position, so as to hold a target against the retainer 12.

Figure 2:
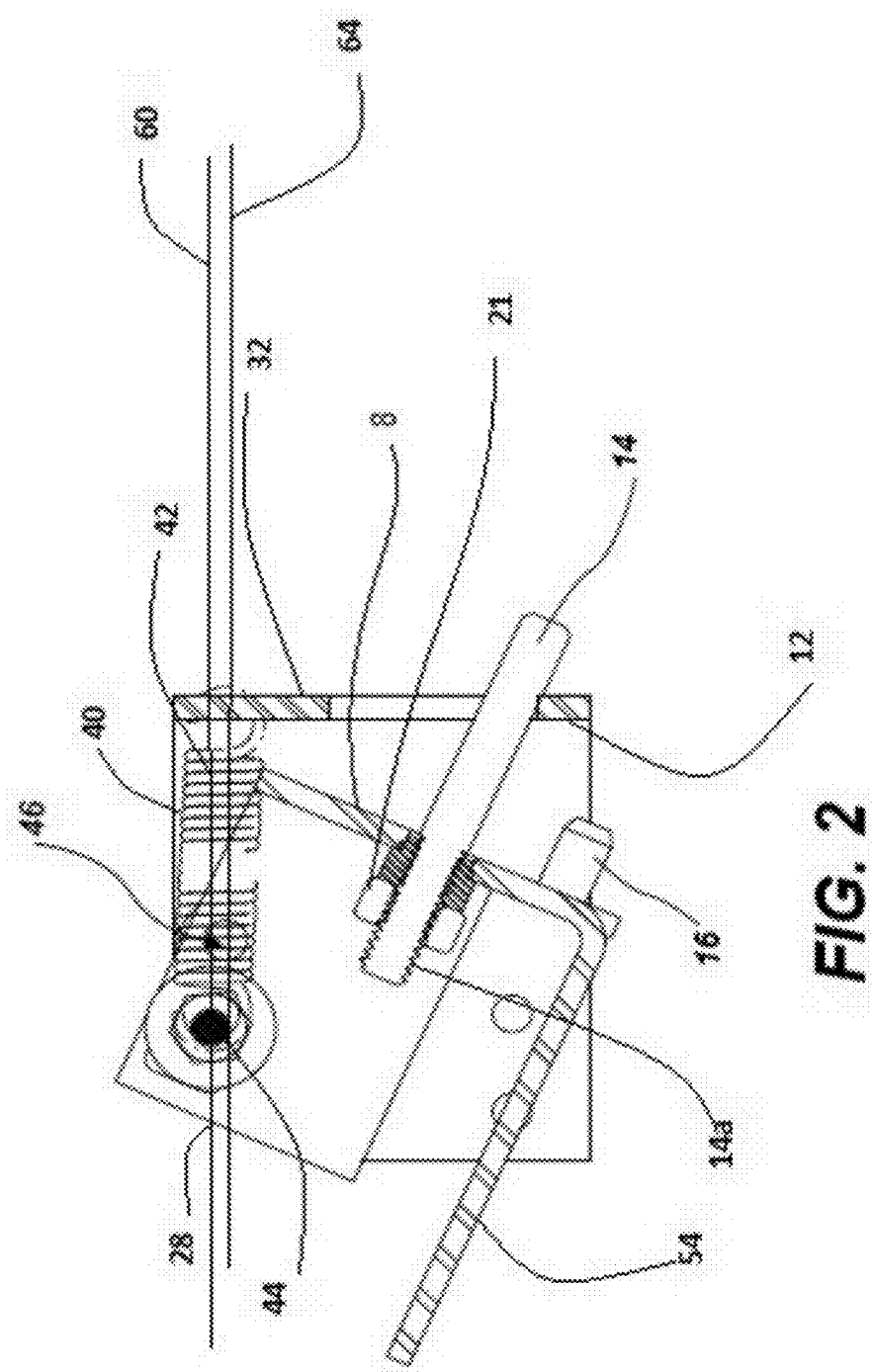
FIG. 2 shows a side, cross-sectional view of the target clamp of FIG. 1 in a first, open position.
Figure 3:
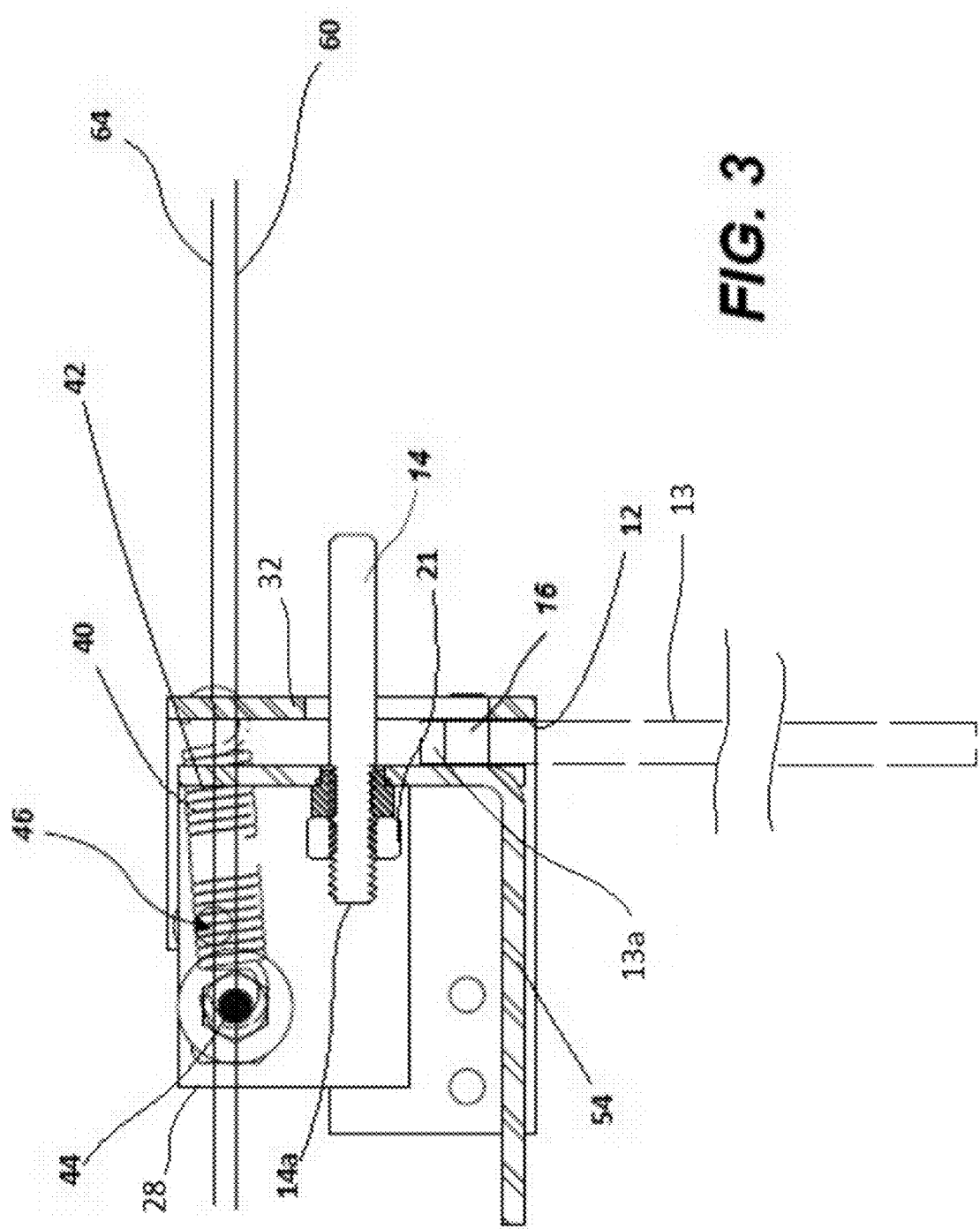
FIG. 3 shows a side, cross-sectional view of the target clamp of FIG. 1 in a second, closed position.

A side, cut-away view of the clamp 4 in the first, open position, is shown in FIG. 2; and a side, cut-away view of the clamp 4 in a second, closed position, is shown in FIG. 3. It can be seen that as extension 14 is pushed upwardly from the first, open position (FIG. 2), the extension 14 brings the target engagement face 8 into near, if not actual, contact with the retainer 12. If a target (shown at dashed lines 13) were positioned between the lower portion of the target engagement face 8 and the retainer, the target engagement face would hold the target against the retainer, thereby securing the target. Thus, while discussed herein as the target engagement face 8 engaging the retainer 12, it will be appreciated that the target engagement face and the retainer only need to be biased toward a position which is closer together than the thickness of the target so that the two surfaces will result in a compressive force on the target to hold the target between the target engagement face and the retainer.

The extension 14 can also be used to more directly move the target engagement face 8 into and out of engagement (or near engagement) with the retainer 12. This may be helpful, for example, where the target material is not sufficiently rigid to move the extension 14 between positions—such as a paper target or a cardboard target which has become wet. By simply moving the extension up (FIG. 3) or down (FIG. 2) the user can move the target engagement face 8 between positions.

The target engagement face 8 may further include additional projections 16, which may be located generally below the extension 14. The projection(s) 16 may extend toward and may extend through the retainer 12. The projections 16 may be teeth which engage the outside of the target, or may be projections which extend through the target (such as a target backer which has one or more complementary holes to accept the projection(s) 16). A target and/or target backer to be held in place by clamp 4 may have holes adjacent an upper end 13a which align with the projections 16 so as to engage the target engagement face 8 and move the target engagement face 8 from a closed position into an open position when a user pulls downwardly on the target, and the hole(s) in the target engaged with the projection(s) 16 exert a downward force on the projection(s) 16. In such a configuration, the retainer 12 may have holes or slots 24 for receiving the projection(s) 16 when the target engagement face is in a second, closed position. It will be appreciated that some configurations are not provided with projection(s) 16 and work to hold the target between the target engagement face 8 and the retainer 12 only through friction.

It will also be appreciated that the extension 14 could be sized to likely be inserted into a hole or slot in the target or target backer and then move the target engagement face 8 into the second, closed position, when the target or backer is pushed upwardly, and back into the first, open position, when the target or backer is pulled downwardly. As shown in FIG. 2, however, the extension 14 can also be used to limit rotation of the engagement face 8 in the first, open position. The same could be accomplished by a stop which engages the mounting frame 28 to prevent over-rotation of the engagement face 8.

The target engagement face 8 may be integrally formed with or attached to a mounting frame 28. The mounting frame 28 may engage a base 32 in such a way that the mounting frame 28 is able to pivot relative to the base 32 so that the target engagement face 8 may pivot relative to the retainer 12. Thus, it will be appreciated that the retainer 12 and the base 32 may be formed from a single piece of material or may be attached to one another. The mounting frame 28 may include one or more dowels 35 (FIG. 1), which may be received by corresponding recesses 37 (FIG. 1) in the base 32. Alternatively, the base 32 may have some sort of projection, such as a dowel, bolt, etc. on which the mounting frame 28 may pivot.

Also shown in FIG. 1 is a biasing element 40. The biasing element 40 may be one or more biasing member such as springs 42, an elastic member (not shown) or some other element to bias the mounting frame 28. As shown in FIG. 1, the biasing element 40 engages the mounting frame 28 adjacent a plane bisecting the pivot point 46 formed by the dowel 35 or other projection on which the mounting frame 28 pivots. This may be accomplished, for example, by one end of the spring 42 attaching to a support bar 44 which extends across the back of the mounting frame 28, with an opposing end being attached via a hole 48 and/or notch 52 in the base 32. The support bar 44 may be disposed slightly below the pivot point 46 when the mounting frame 28 is flat, but above the pivot point when the mounting frame is rotated into the first, open position. (It will be appreciated that numerous different structures may be used for attaching the end of the biasing element 40 to the mounting frame.)

As shown in FIG. 2, the center point of the support bar 44 (represented by line 60) is disposed above the center point of the pivot point 46 (as represented by the line 64) when the mounting frame 28 is oriented so that the target engagement face 8 is in the first, open position. The force of the spring(s) 42 bias the mounting frame 28 in that orientation with the support bar 44 being held above the pivot point 46.

In contrast, in FIG. 3, the mounting frame 28 has been rotated upwardly at the forward end, thereby rotating the support bar 44 so that its center point (as represented by line 60) is now oriented below the center point (represented by line 64) of the pivot point. In such a configuration, the spring(s) 42 pull forwardly on the support bar 44 and bias the mounting frame 28 so that the target engagement face 8 is in the second, closed position. To move between positions, the force exerted on the extension 14 or projections 16 need merely be greater than the force of the spring biasing the support bar 44 either above or below the pivot point 46.

It will be appreciated that the same result could be accomplished by attaching the biasing element 40 below the pivot point 46 and directing the bias away from the target engagement face 8, etc., to hold the mounting frame in the first, open position, and then having the attachment point of the spring 42, etc. move above the pivot when the mounting frame 28 is moved into the second, closed position. Likewise, a shaped memory material could be attached to the mounting frame so that one end moves from above the pivot point in the first, open position, and then to a point below the pivot point in the second, closed position, with the biasing element returning to its original shape to hold the mounting frame in either position until sufficient force is applied to overcome the bias.

When an upward force, or force generally perpendicular to the biasing element 40, is applied to the target engagement face 8, typically by engaging the projection(s) 16 or extension 14 with a target, the mounting frame 28 rotates about the pivot point 46 until the biasing element 40 is attached to the mounting frame 28 on the opposite side of a plane passing through the pivot 46 horizontally.

In accordance with one aspect of the invention, movement of the target clamp 4 into and out of the second, closed position, can typically be done by simply pulling downwardly on a target, the downward pull on the target causing a downward force on the projection(s) 16 engaged with the target. If desired, the extension 14 may function as a handle and may also be used so that the user does not need to pull on the target. Use of the extension 14 as a handle may be practical if the targets being shot are of a thinner material and less able to withstand the force of a downward pull, such as using a paper target as opposed to one made of thick cardboard. FIG. 1 also shows a tab or lever 54 which may be pressed to open the clamp (i.e., pivot the target engagement face 8 clockwise). The tab 54 may be connected to the mounting frame 28 opposite extension 14. The tab may be provided in addition to or in replacement of the extension 14 and either may be used to move the clamp 4 from a second, closed position, to a first, open position.

While discussed herein as the target being mounted from the bottom, up into the clamp 4, other orientations are possible. It will be appreciated that a target could be placed into the clamp with the clamp oriented so that the target is advancing sideways, or such that the target is being moved vertically downward as it engages the clamp and moves the target engagement face 8 from the first, open position, to the second, closed position.

It will be appreciated that the same result could be accomplished by attaching the biasing element 40 below the pivot point 46 and directing the bias away from the target engagement face 8, etc., to hold the mounting frame in the first, open position, and then having the spring 42, etc. move above the pivot when the mounting frame is rotated upwardly into the second, closed position. Likewise, a shape memory material could be attached to the mounting frame so that one end moves from above the pivot point in the first, open position, and then to a point below the pivot point in the second, closed position, with the biasing element returning to its original shape to hold the mounting frame in either position.

It will also be appreciated that the clamp 4 may be used in any orientation. While shown and discussed as rotating about a horizontal plane with the target engagement face 8 moving generally vertically in FIGS. 1-3, the same configuration could be rotated 90 degrees upwardly or downwardly so that the target is inserted from the side or 180 degrees so that the target is inserted from the top. Likewise, the configuration could be rotated 90 degrees away from the viewer so that the target is inserted from the side and extends generally horizontally from the clamp.

Figure 4:
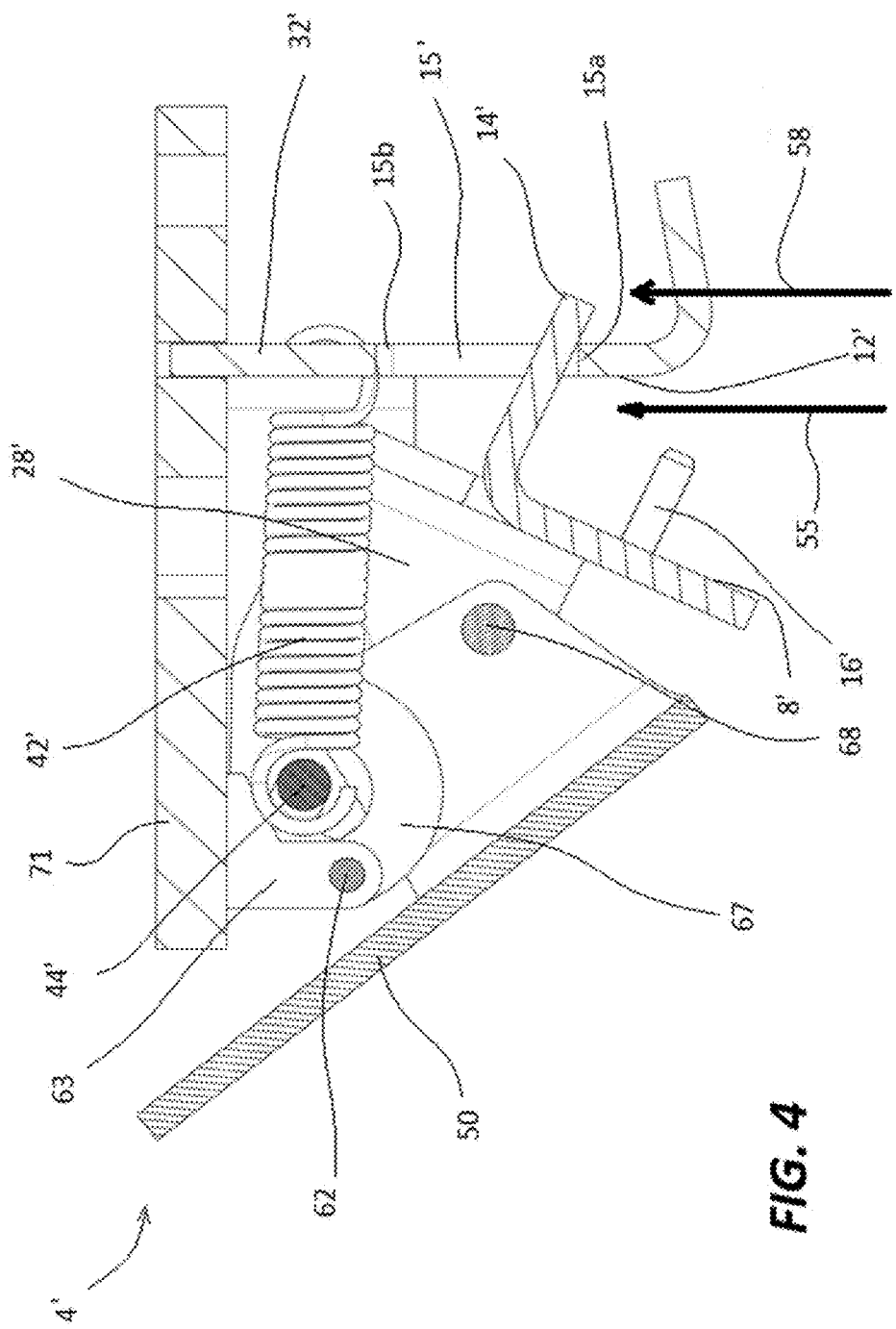
FIG. 4 shows a side, partially cut-away view of another target clamp configuration according to the present disclosure, the target clamp in an open position.
Figure 5:
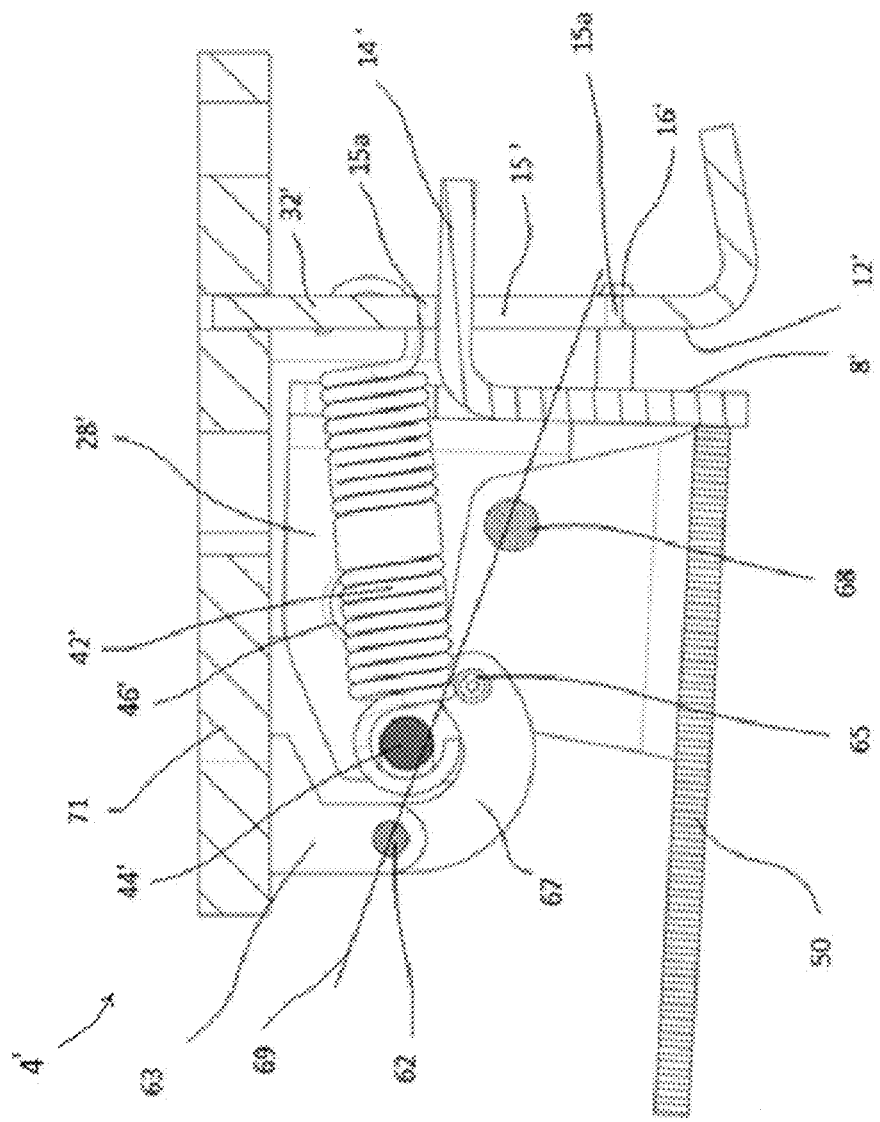
FIG. 5 shows a side, partially cut-away view of the target clamp of FIG. 4, the target clamp in a closed position.
Figure 6:
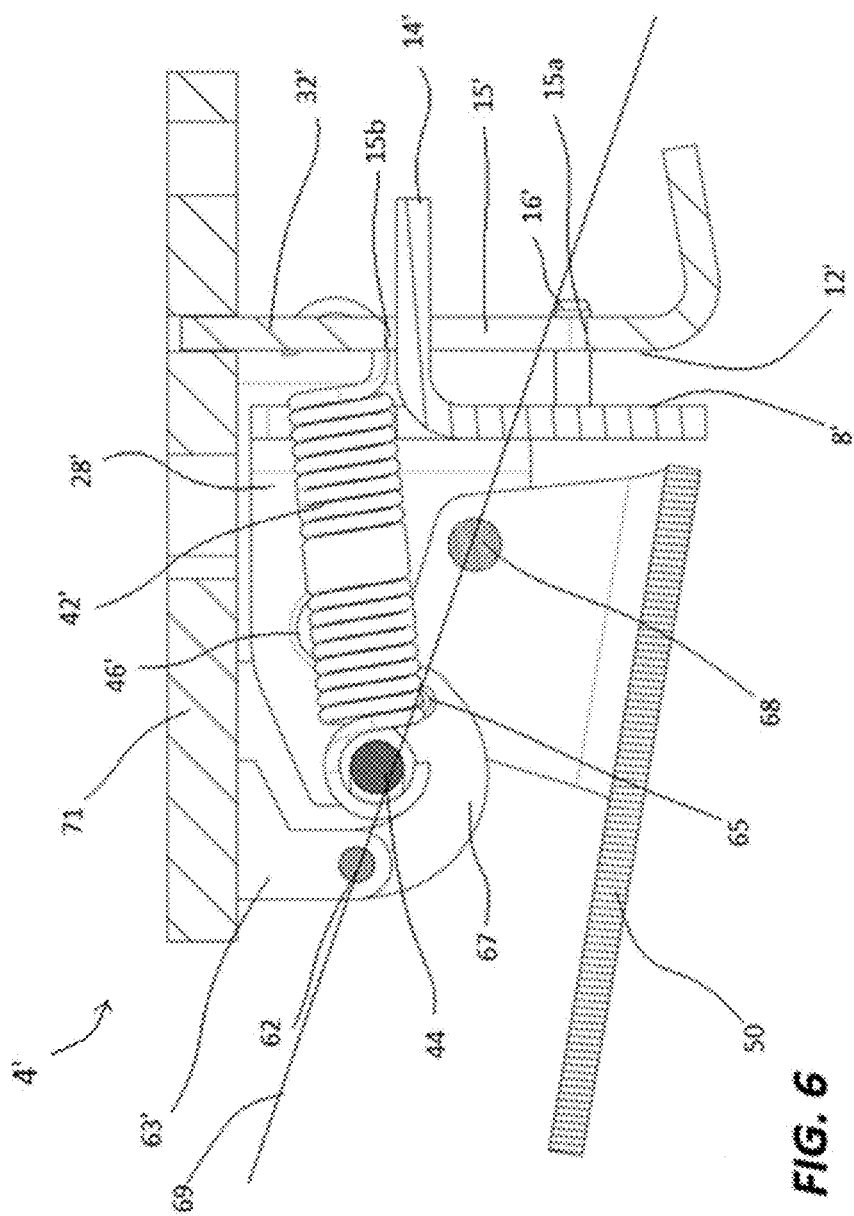
FIG. 6 shows a side, partially cut-away view of the target clamp of FIG. 4, the target clamp in a partially closed position.

Turning now to FIG. 4, there is shown a side, cut-away view of another configuration of a clamp, generally indicated at 4'. Clamp 4' is in an open position in FIG. 4 (the same configuration of clamp 4' can also be seen in FIG. 5 in a fully closed position and FIG. 6 in a closed position for reference). The clamp 4' generally comprises a target engagement face 8'. Attached to, or formed integrally with the target engagement face 8' may be an extension 14' which limits rotation of the target engagement face in either direction. One or more projection(s) 16' for engaging one or more complementary holes or recesses in a target to be held by the clamp 4' may also be provided. It will be appreciated that FIGS. 1-3 show the extension 14 as a separate bolt connected to the target engagement face 8, while FIGS. 4-6 show the extension 14' as being integrally formed with the target engagement face 8'.

The extension 14' may pass through a recess, hole, or opening 15' on the retainer 12'. The opening 15' may be large enough for the extension 14' to move freely from an open position (shown in FIG. 4, wherein the extension 14' rests at the bottom portion 15a of the opening 15') to a closed position (shown in FIGS. 5-6, wherein the extension 14' is near the top portion 15b of the opening 15'). For example, the target engagement face 8', and thus the extension 14' formed integrally with the target engagement face 8', may rotate about 20 degrees to about 40 degrees relative to the retainer 12' between the open and closed position. The configuration shown in FIGS. 4-6 shows the target engagement face 8' rotating about 25 degrees relative to the retainer 12' between the open and closed position.

The target engagement face 8' may also be connected to a mounting frame 28' for mounting the target engagement face 8'. A dowel, screw, or other mechanism (not visible in FIG. 4, as it is located behind the spring 42') may be used to pivotably connect the mounting frame 28' to the retainer 12' and/or base 32' of the retainer 12', so as to form a pivot point 46' (FIG. 5). The mounting frame 28' may pivot relative to the retainer 12' about this point, and allow the rotation of the target engagement face 8' and extension 14' within the opening 15' of the retainer 12' described above.

The configurations shown in FIGS. 4-7 may further comprise a locking lever 50. This locking lever 50 may ensure that the target engagement face 8' and retainer 12' remain in a closed position unless the locking lever is lifted (as described below).

In the fully open position shown in FIG. 4, the target engagement face 8' and extension 14' cannot rotate any farther in the clockwise direction. The extension 14' is prevented from additional clockwise rotation by its engagement with the bottom 15a of the opening 15'. The spring 42' (or another type of biasing member may be provided) exerts a pull on the attachment point 44' which is effectively above the center of the pivot point 46' and thereby biases the mounting frame 28' and the target engagement face 8' to hold it in this position. In this position, the extension 14' is in a downward position.

The clamp 4' may be closed by inserting a target backer upwardly, as indicated by arrow 55, between the target engagement face 8' and the retainer 12'. The force of the top of the target backer against one of the projections (i.e., the extension 14' or the projections 16') may lift the mounting frame 28' upwardly and cause the target engagement face 8' to rotate counter-clockwise towards the retainer 12'. Alternatively, or in addition to the target backer being inserted at arrow 55, a user may push upwardly on the portion of the extension 14' that extends through the opening 15' on the retainer 12' as indicated by arrow 58 in FIG. 4. As the target engagement face 8' rotates counter-clockwise towards the retainer 12', the projection(s) 16' on the target engagement face 8' may either pass through complementary recesses provided in the target and/or engage the target (such as through a friction fit, teeth which pierce into the target, projections 16' puncturing target paper, etc.).

FIG. 5 shows a side, partially cut-away view of the clamp 4' in a fully closed position. When the clamp 4' is closed, the locking lever 50 keeps the target engagement face 8' from rotating clockwise. In this position, the spring 42' pulls the target engagement face 8' in a counter-clockwise direction. The locking lever 50 may be attached to the top mounting structures via three hinges or joints. A stationary joint 62 is formed by the connection of an arm 63 extending from a mounting plate 71 to a floating arm 67. A second joint 65 which can move or float vertically relative to the mounting plate 71 may be formed by a pivotable attachment between another part of the floating arm 67 and a portion of the locking lever 50. A third joint 68 may be formed by a pivotable attachment between the lockable lever 50 and the mounting frame 28.

The locking lever 50 keeps the target engagement face 8' from rotating open (clockwise in FIGS. 4-6). In the locked position shown in FIG. 5, the second, floating joint 65 is slightly below the line formed between a plane 69 bisecting the joint 62 and the joint 68. In such a position, the locking lever 50 is biased into the locked position wherein it prevents movement of the target engagement face 8'. The locking lever 50 must be pushed upward by a user, and the hinge or second joint 65 must pass the line 69 bisecting the joint 62 and the joint 68 before the locking lever 50 will no longer be biased in a locking position. As shown in FIG. 6, joint 65 is at the point of equilibrium. If the lever is lifted any more, the locking lever will unlock and allow movement of the mounting frame 28'. If it moves downward, the locking lever 50 will lock and prevent movement of the mounting frame.

Figure 7:
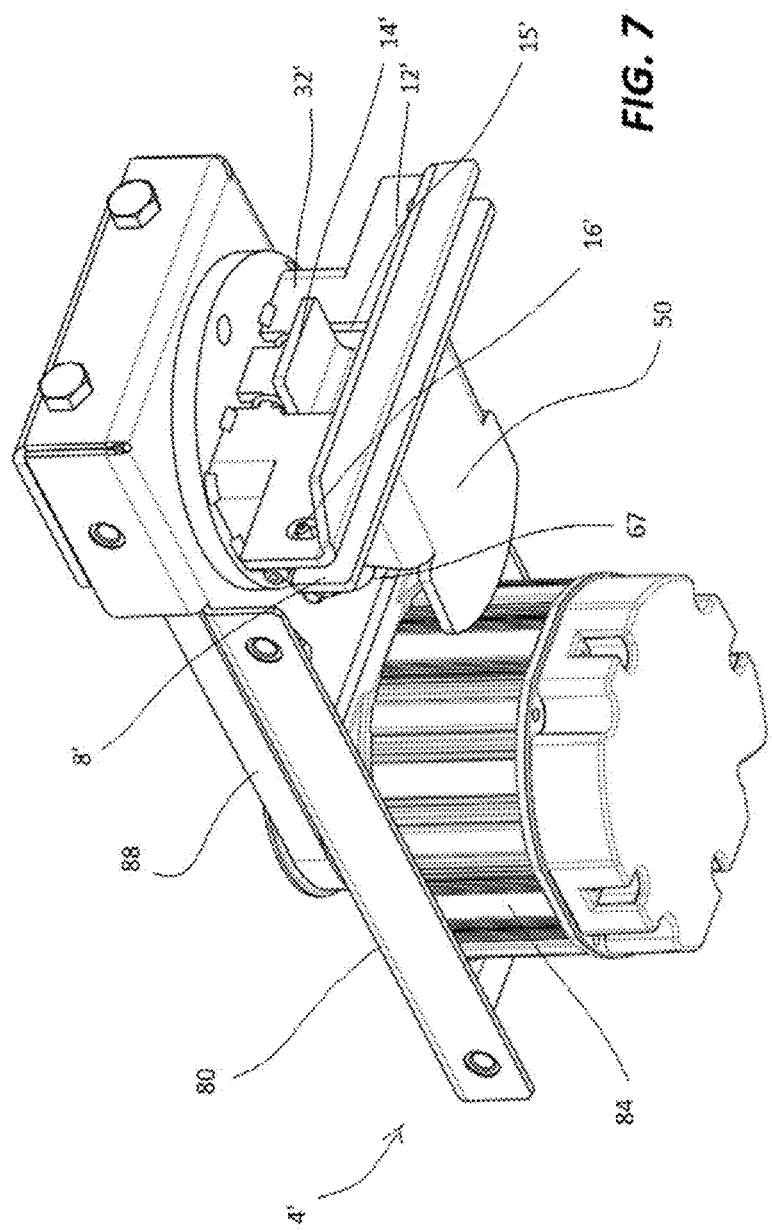
FIG. 7 shows a bottom, perspective view of the target clamp of FIG. 4, attached to a portion of a target retriever.

FIG. 7 shows a bottom, perspective view of a clamp 4' attached to a portion of a target carrier 80, including a motor unit 84 to rotate the clamp 4' via a belt 88, chain, or gear train. Those skilled in the art will appreciate that a target carrier (whether a target retriever or a stationary carrier) will usually have a blocking plate (not shown) which protects the motor unit 84 and the clamp 4' from being hit by projectiles. Thus, the clamping mechanism is protected from stray shots, etc., which could cause damage to the clamp and cause the clamp to fail. Additionally, the biasing element, etc., is located behind the front of the clamp, providing additional protection to the clamp functionality.

Figure 8:
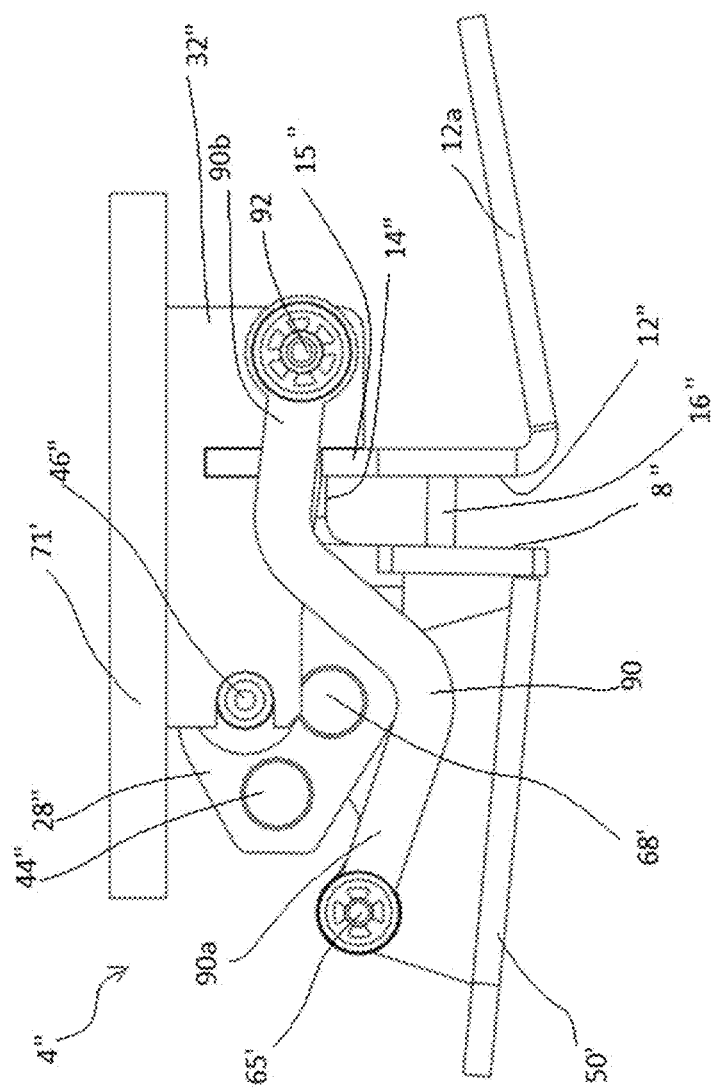
FIG. 8 shows a side view of another target clamp configuration according to principles of the present disclosure.

FIG. 8 shows a side target engagement face 8" view of another target clamp, generally indicated at 4". The target clamp 4" includes a target engagement face 8" and a retainer 12". Attached to, or formed integrally with the target engagement face 8" may be an extension 14", only a small portion of which is visible. As will be explained below, the extension 14" can be used both to limit the amount of rotation of the target engagement face 8", and to act as a handle for manually moving the target engagement face between the first, open position, and the second, closed position. To this end, the extension 14" can travel within opening 15 as was discussed previously with respect to FIG. 4.

The target clamp 4" includes a mounting plate 71' which may be connected to the base 32" for attachment to a target retriever, a base unit or other structure. While shown herein as two pieces attached to one another, the mounting plate 71' and the base 32" could be made integrally. Likewise, the base 32" and the retainer 12" can be formed separately or as a single piece of material. A mounting frame 28" may be pivotable attached to the base 32" by a pivot point 46".

FIG. 8 shows the target clamp 4" in a closed position such that the projections 16" extending from the target engagement face 8" may extend toward, or into a channel or void in, the retainer 12" to thereby help secure a target or target backing between the target engagement face and the retainer. When in a second, closed position as shown in FIG. 8, the locking lever 50' may extend into engagement with the back side of the structure forming the target engagement face 8" to thereby hold the target engagement face in a second, closed position.

The body of the locking lever 50" may be attached to the mounting frame 28" by a pivot structure or third joint 68', which may be formed by a pin, a dowel, a rod or other structure which allows the locking lever and the mounting frame to pivot with respect to one another. The locking lever 50" may also have a pivot structure or second joint 65' which may be toward an opposing end of the locking level body. The second joint 65' engages a pivot arm 90 adjacent a first end 90a thereof. A second end 90b of the pivot arm 90 may engage the base 32" at a pivot point formed by a pivot point or hinge 92 formed by a pin, dowel, rod, etc. so that the pivot arm may move with respect to the base and the locking lever 50".

Also shown in FIG. 8 is a pin, rod or other anchor 44" disposed on the mounting frame 28" for receiving a biasing element (not shown) to selectively bias the mounting frame 28" into one of two positions which correspond with the first, open position, and the second, closed position, of the target engagement face 8".

Figure 9:
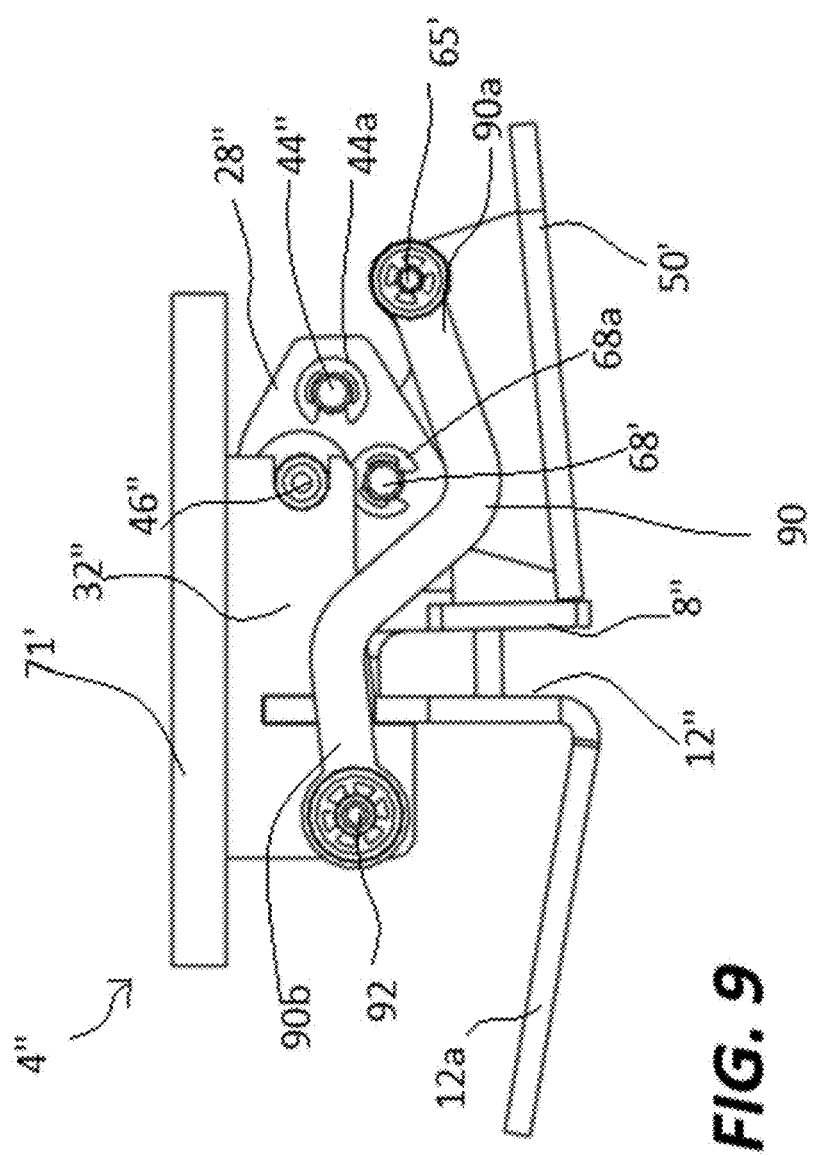
FIG. 9 shows an opposing side view of the target clinic configuration shown in FIG. 8.

Turning now to FIG. 9 there is shown an opposing side view of the target clamp 4". The support bar 44" is held in place by a pin clip 44a. The pin which forms the third joint 68' likewise may use a pin clip 68a or some other structure. The remaining structures are numbered according to the discussion regarding FIG. 8.

Figure 10:
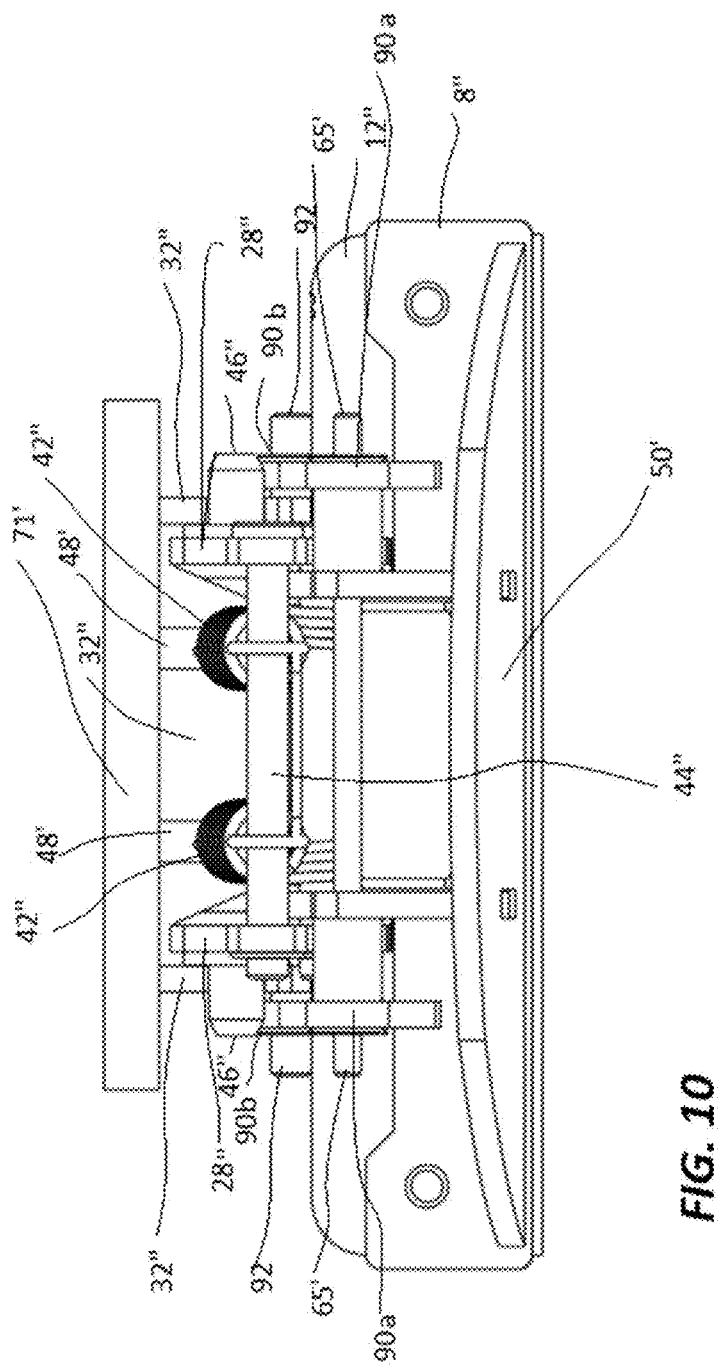
FIG. 10 shows a rear view of the target clamp configuration shown in FIG. 8.

Turning now to FIG. 10, there is shown a rear view of the target clamp 4" configuration shown in FIG. 8. The view makes visible the biasing element or member in the form of a pair of springs which are attached at one end through the slots 48' in the base 32' and at an opposing end on the support bar 44" connected to the mounting frame 28". When the support bar 44" is disposed below the pivot point 46" about which the mounting frame 28" pivots with respect to the base 32", the springs 42" of player force which hold the mounting frame in the position shown which is consistent with the engagement base 8" being advanced toward the retainer 12" to hold a target in place. If the support bar 44" were disposed above the center of the pivot point 46", the mounting frame 28" would be biased upwardly rearward of the pivot point and downwardly forward of the pivot point so that the target engagement face 8" would be moved away from the retainer 12". The target engagement face 8" can be locked in this position by pulling downwardly on the locking lever 50' thereby pivoting the body of the locking lever with respect to the mounting frame 28" at joint 65' and cause movement of the pivot arm 90 as described above.

Figure 11:
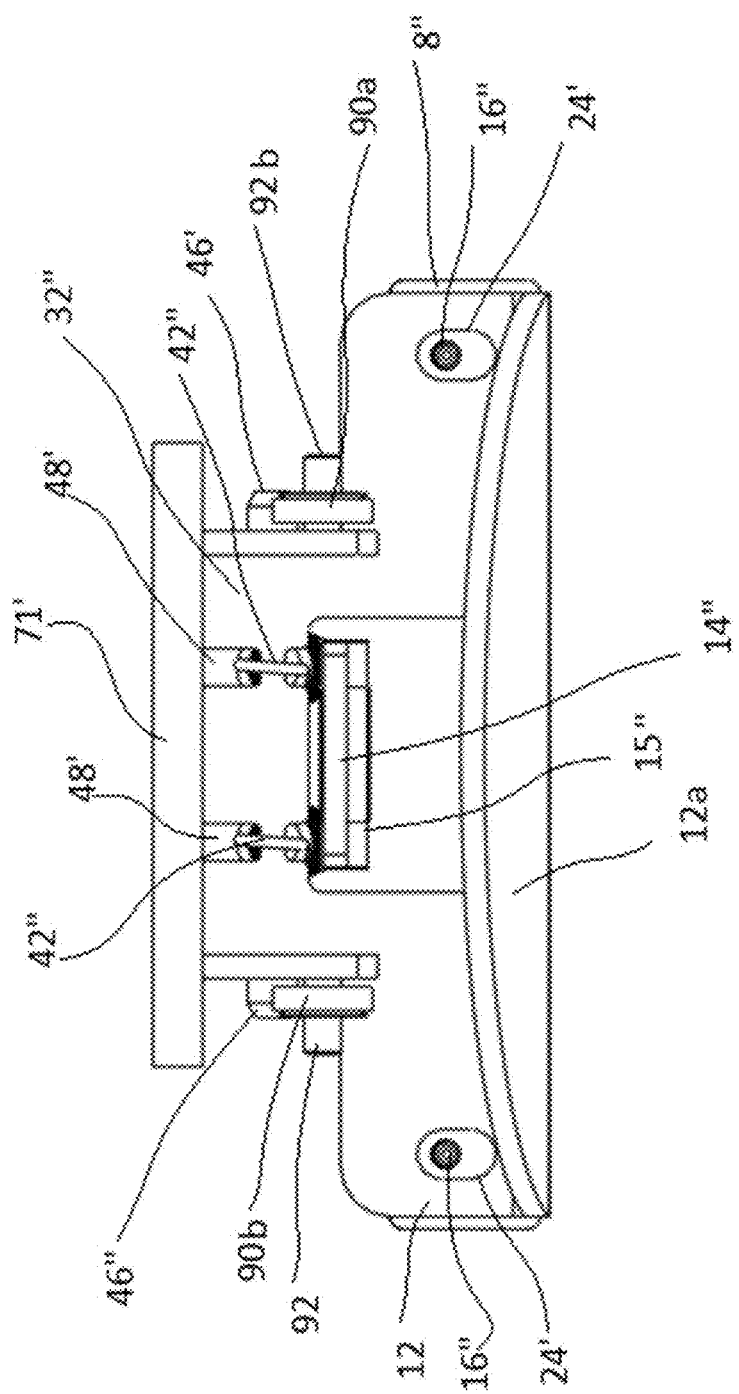
FIG. 11 shows a front view of the target clamp configuration shown in FIG. 8.

FIG. 11 shows a front view of the target clamp 4" so that the engagement of the biasing elements or springs 8" with the base 32" through the slots 48' can be seen. Also visible is the extension 14" which extends through the opening 15" in the base 32". The extension 14" is in the upper position consistent with the target engagement face 8" being advanced toward the retainer. Also visible in FIG. 11 are the pivot points 46" about which the mounting frame (not visible in FIG. 11) rotate, as well as the second ends 90b of the pivot arms and the hinges 92 formed thereat with the base 32". The projections 16" disposed in the slots 24' in the retainer 12 can also be seen.

Figure 12:
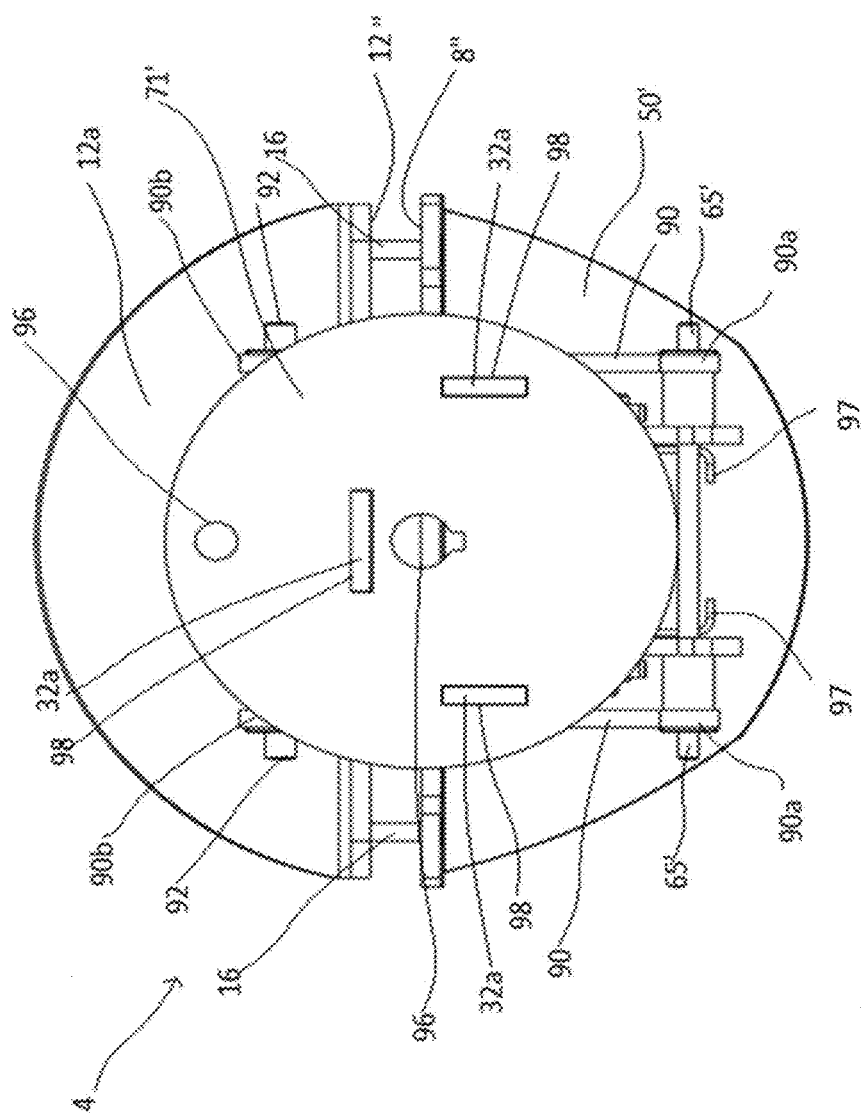
FIG. 12 shows a top view of the target clamp configuration shown in FIG. 8.

FIG. 12 shows a top view of the target clamp 4" with the mounting plate 71' being disposed generally in the middle of the target clamp. It will be appreciated, that of a variety of mounting plates mounting brackets having any number of configurations could be used to mount the target clamp 4" to a target retriever, a base unit, or some other structure. The mounting plate 71' may have one or more holes 96 or slots to facilitate attachment to the other structure. Additionally, the mounting plate 71' may have slots 98 which receive an upper portion 32a of the base (otherwise not visible in FIG. 12).

Also visible in FIG. 12 are locking lever 50' which engages the backside of the target engagement face 8", along with the opposing ends 90a and 90b of the pivot arms 90, along with their hinges 65' and 92. The projections 16' can also be seen. Furthermore, a pair of spring clips 97 may be disposed so as to extend into contact with the locking lever 50' and the flange 12a which extends from the retainer 12".

Figure 13:
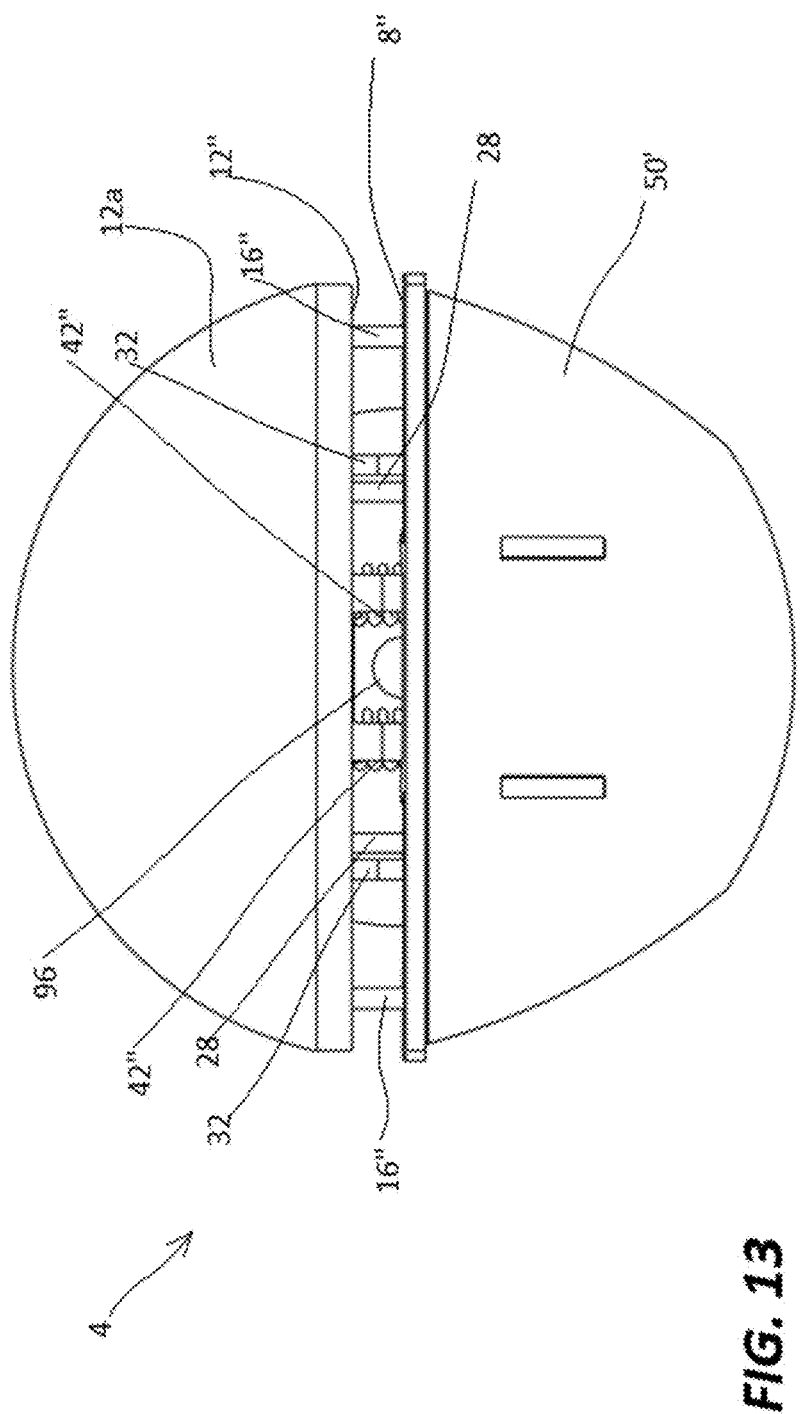
FIG. 13 shows a bottom view of the target clamp configuration shown in FIG. 8.

Turning now to FIG. 13, there is shown a bottom view of the target clamp 4". The flange 12a and extending from the retainer 12" is readily apparent, as is the locking lever 50' which is disposed in engagement with the backside of the structure forming the target engagement face 8" so as to hold the target engagement face adjacent the retainer 12". The slots 99 in the locking lever 50' can be used to receive the body 50a which engages the hinges 68' and 65'.

Also visible are the projections 16" which can be used to assist with engaging a target disposed in the slot between the target engagement face 8" and the retainer 12. Likewise, a small portion of the base 32" and the mounting frame 28" can be seen, as well as the springs 42" which form the biasing member element for holding the clamp in either the first, open position, or the second, closed position, depending on the orientation of the target clamp 4".

Figure 14:
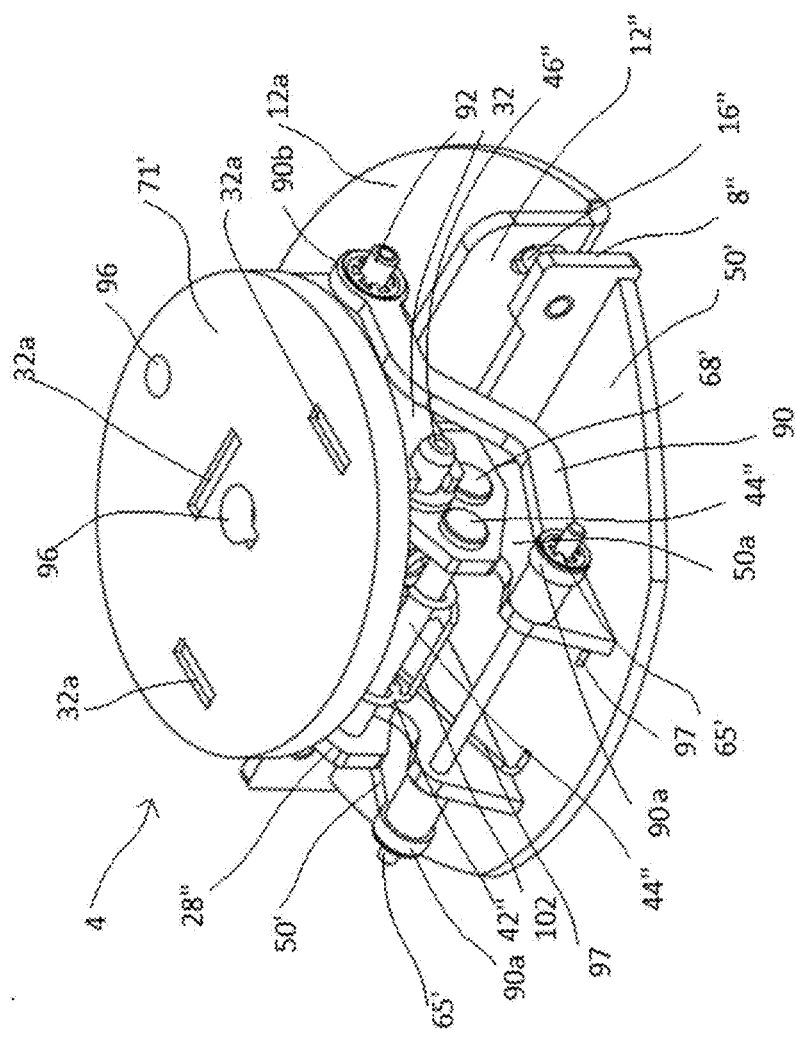
FIG. 14 shows a rear perspective view of the target clamp configuration shown in FIG. 8.

FIG. 14 shows a rear perspective view of the target clamp configuration shown in FIG. 8. The mounting frame 28" is generally visible as it extends from the pivot point 46" where it pivotably engages the base 32". The mounting frame 28" may be attached to the body 50a of the locking lever 50' by a pin, etc. forming a hinge 68'. The mounting frame may also hold the support bar 44" to which one end of the springs 42" or other biasing member(s) may be anchored. A retention bracket 102 may be attached to the springs 42" to keep them spaced a proper distance. Alternatively, the spring clip 97 may be configured to engage the support bar 44" and thereby provide a physical obstruction to the ends of the springs moving toward one another. Thus, structure 102 could also be a portion of the spring clip 97.

As was discussed above, when the support bar 44" is disposed above the center of the pivot point 46" the rear end of the mounting frame 28" will pivot upwardly drawing the target engagement face 8" away from the retainer 12" and bias the structure in the orientation. However, when the support bar 44" is disposed below the pivot point 46" the rear end of the mounting frame 28" is biased downwardly, thereby urging the target engagement face 8" toward the retainer 12".

The spring clip 97 can be used to bias the locking lever 50' downward with respect to the mounting frame 28" to thereby move or hold the locking lever into a locking position wherein it abuts the structure forming the target engagement face 8". The spring clip may wrap around the pin, bar, etc. which forms the second joint 68' and passes through the body 50a of the locking lever 50' and the mounting frame 28".

Figure 15:
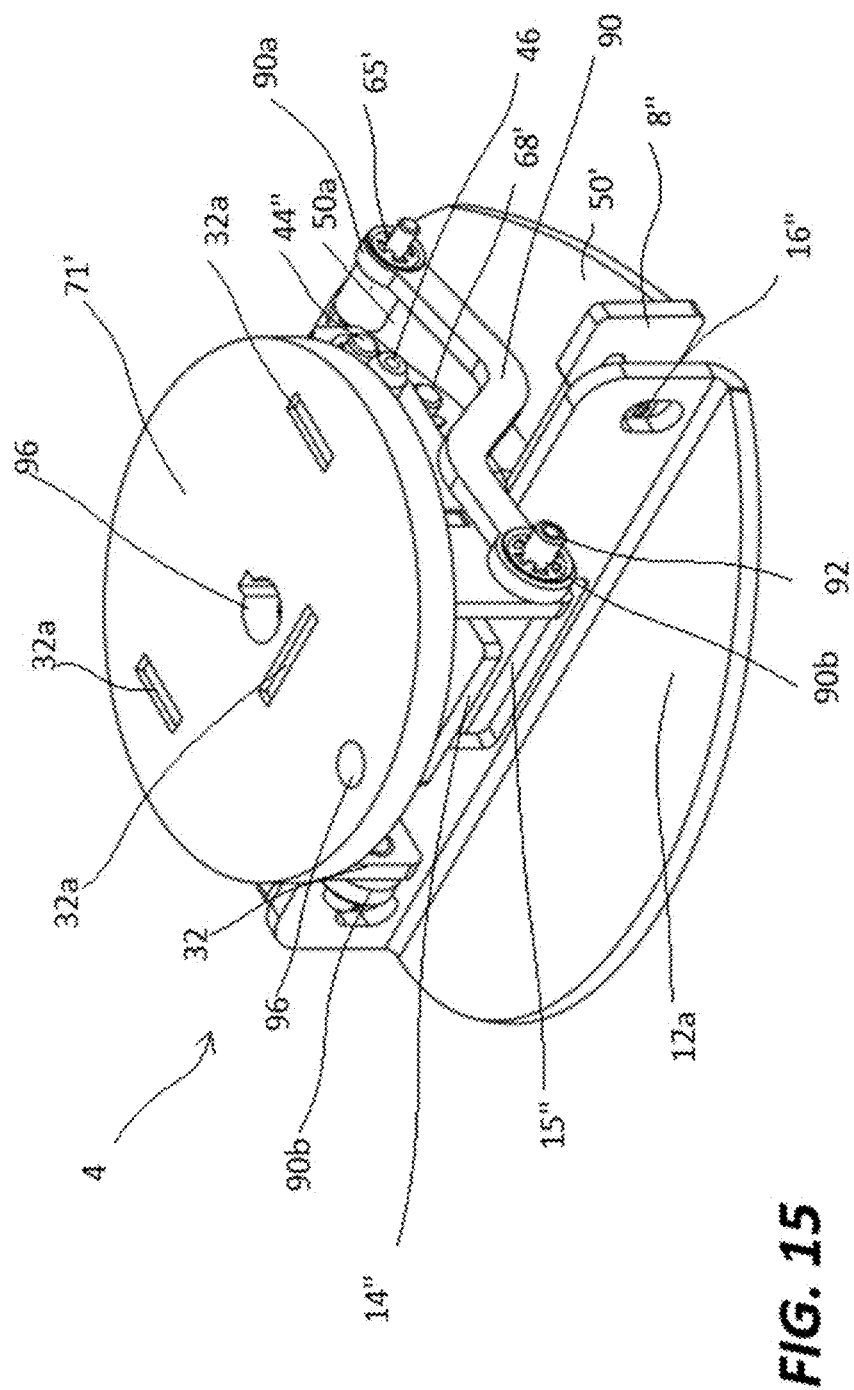
FIG. 15 shows a front perspective view of the target clamp configuration shown in FIG. 8.

FIG. 15 shows a front perspective view of the target clamp 4". The front view shows the extension 14" can be moved in the opening 15" to move the target clamp 4" between a first, open position, and a second, closed position, similar to that shown in FIG. 15. The pivot arm 90 is shown with the first end 90a being disposed in communication with the body 50a of the locking lever 50' on one side, while only the second end 90b attached to the base 32" is shown on the opposing side.

Other structures such as the land 12a, the projection 16", a portion of the target engagement face 8" and the hinges 65' and 68' are visible on one side of the image. The pivot point 46 and the support rod 44" can also be seen. Likewise the mounting plate 71', along with the holes 96 and the portions 32a of the base 32" are visible. It will be appreciated from the various embodiments shown herein that multiple modifications can be made to any portion of the target clamp 4" by selecting various aspects shown in the drawings.

Figure 16:
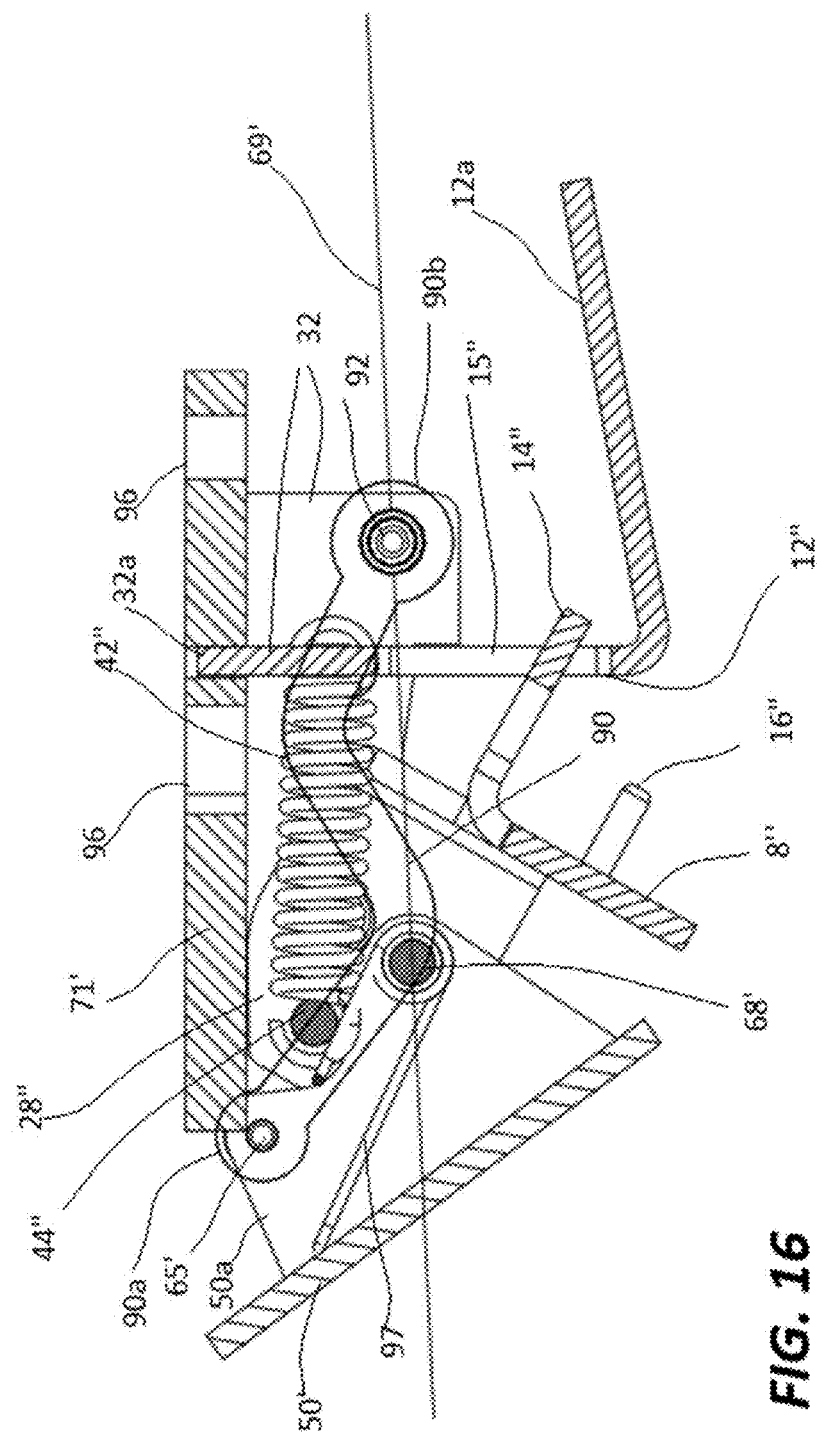
FIG. 16 shows a side cross-sectional view of the target clamp configuration of FIG. 8 in a first, open position.

Turning now to FIG. 16, there is shown a side cross-sectional view of the target clamp 4" in a first, open position. The locking lever 50' has been moved out of engagement with the backside of the structure forming the target engagement face 8" and pivoted away there from. The movement of the locking lever 50' and the locking lever body 50a causes the pivot arm 92 pivot about hinge 92 at the second end 90. The locking lever 50' and locking lever body 50a also pivot about hinge 68' so as to pivot relative to the mounting frame 28". The movement of the locking lever 50' also allows the mounting frame 28" to pivot about the pivot point (not shown in FIG. 16) so that the rear portion of the mounting frame moves upwardly. As shown in FIG. 16, the mounting frame 28" may move upwardly into engagement with the mounting plate 71'. The upward movement of the rear portion of the mounting frame 28" causes a downward movement by the front portion of the mounting frame, as well as by the structure forming the target engagement face 8" and the extension 14". The ultimate movement of the mounting frame 28", the target engagement face 8" and the extension 14" may be limited by the size of the opening 15", or by engagement of the mounting frame with the mounting plate 71'.

In this position, the support bar 44" will be generally above the pivot point (not shown) so that the spring 42" or other biasing member(s) biases the mounting frame 28" into the position shown. As such, the target clamp 4" is ready to receive a target. If the target is a more rigid material, such as sturdy cardboard or some other backer, pushing upwardly with the target against the extension 14" or against the projection 16" will push the forward portion of the mounting frame 28" upwardly, thereby causing rotation of the support bar 44" downwardly and changing the bias provided by the spring 42" from retaining the mounting frame in the open position shown into a closed position.

Also shown in FIG. 16 is a line 69' which bisects the hinge 92 at the second, closed position, and 90b of the pivot arm 90 and the hinge or pivot point 68' which pivotably connects the body 50a of the locking lever 50' to the mounting frame 28". The pivot point or hinge 65', which is disposed at the first end 90a of the pivot arm 90, is disposed well above the line 69'.

Figure 17:
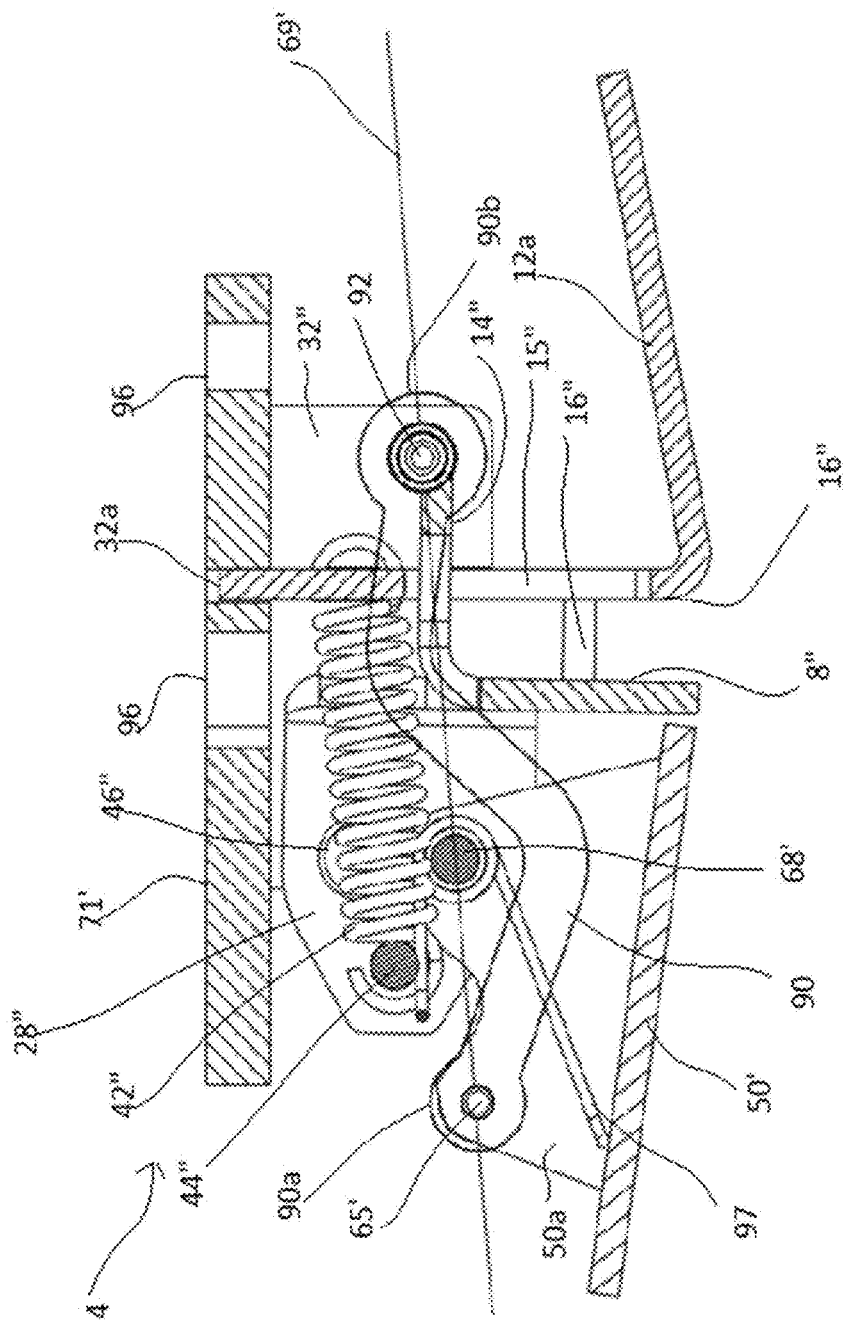
FIG. 17 shows a side cross-sectional view of the target clamp configuration of FIG. 8 in a partially closed position.

FIG. 17 shows a side cross-sectional view of the target clamp 4" in a second, closed position. The extension 14" has been raised in the opening 15" so as to cause the mounting frame 28" to rotate about the pivot point 46' until the support bar 44', which is engaged by the biasing member in the form of spring(s) 42", as positioned generally below the pivot point. This causes the springs 42" to bias the mounting frame 28" into the position shown, with the target engagement face 8" having been advanced toward the retainer 12" and the projections 16" extending toward or into slots in the retainer. In this position a target or target backer can be securely held between the target engagement face 8" and the retainer 12".

It will be noted that the pivot point or hinge 65' at the first end 90a of the pivot arm 90 is disposed in general alignment with the pivot point or hinge 68' and pivot point or hinge 92. In this position, however, the locking lever 50' is not engaging the backside of the structure forming the target engagement face 8". Thus, while the target clamp 4" is in the second, closed position, it is not locked in place.

Figure 18:
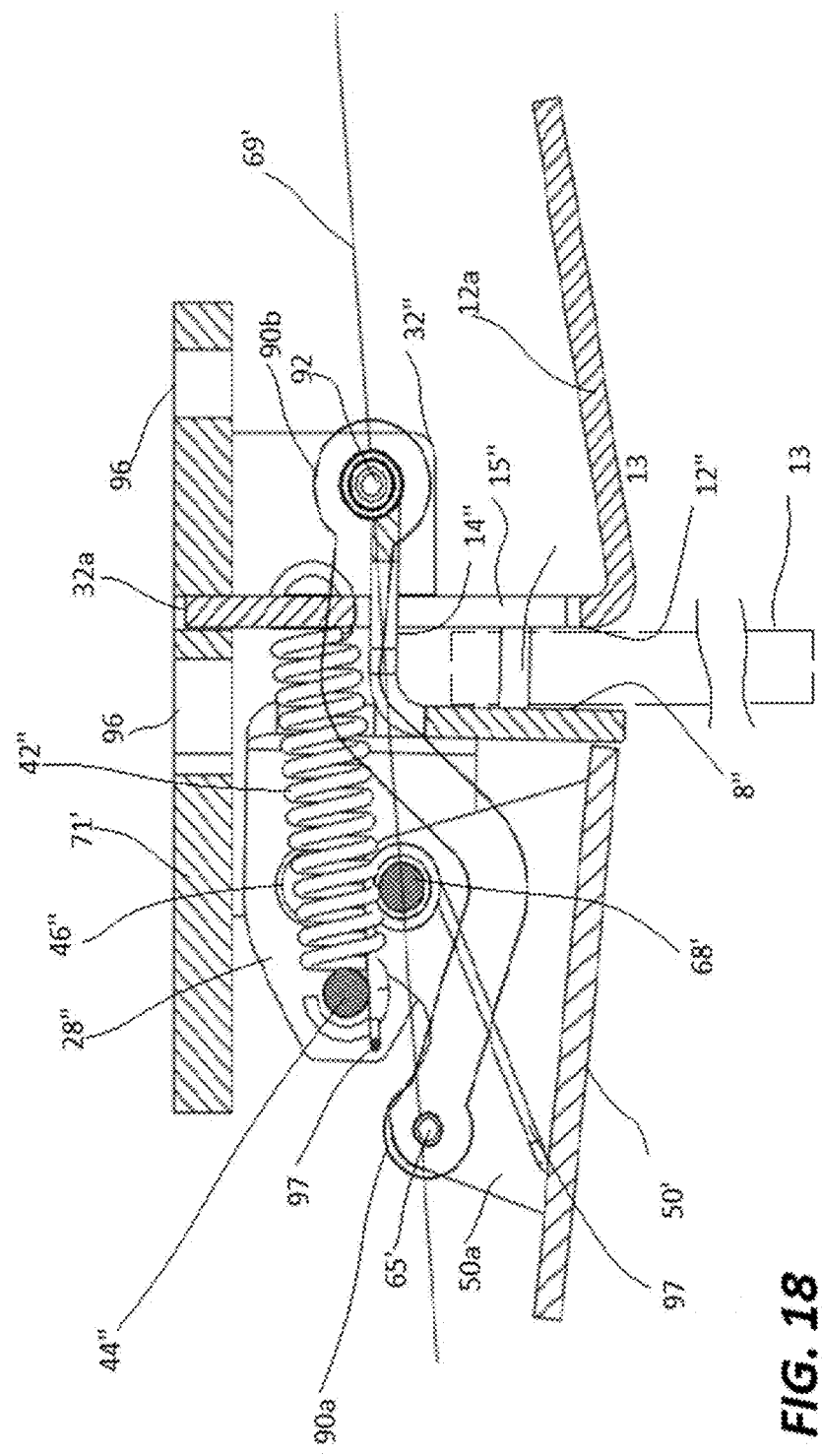
FIG. 18 shows a side cross-sectional view of the target clamp configuration of FIG. 8 in a second, closed position.

Turning now to FIG. 18 there is shown a side cross-sectional view of the target clamp 4" in a third, locked position. The orientation is similar to that shown in FIG. 17 except that the locking lever 50' has been pulled downwardly so that the pivot point or hinge 65' engaging the first end 90a of the pivot arm 90 is disposed generally below the line 69' bisecting the pivot point or hinge 68' and the pivot point or hinge 92. With the pivot point or hinge 65' in this orientation, the spring clip 97 will tend to bias the locking lever 50' into engagement with the structure forming the target engagement face 8" and hold it in the position shown in FIG. 18.

In order to release the locking mechanism, all that one needs to do is push upwardly on the rear end of the locking lever 50' sufficiently to move the pivot point or hinge 65' above the line 69 which bisects pivot points or hinges 68' and 92. This moves the target clamp 4" out of the third, locked position, and into the second, closed position, wherein control over the target clamp can be exercised. For example, by moving the extension 14" up or down in the opening 15", the target clamp 4" can then be moved out of the second, closed position, by simply pulling down on the extension 14"; or, if the target is sufficiently durable, by pulling downwardly on the target or target holder. This causes the downward force to be applied to the projections 16" and cause the mounting frame 28" to rotate sufficiently that the holding rod 44" moves back above the pivot point 46' and the spring 42" biases the target clamp into the first, open position.

Without releasing the locking lever 50', the target engagement face 8" will remain locked in the closed position. Moving the locking lever from the second, locking position, back into a first, unlocked position, as shown in FIG. 17 allows the user to open the target clamp 4" either pulling on the target 13 or moving the extension 14". This returns the target clamp 4" back to the first, open position.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A target clamp for holding targets comprising:
a retainer;
a mounting frame;
a target engagement face connected to the mounting frame,
the mounting frame and target engagement face being pivotably movable and selectively disposable adjacent the retainer, the target clamp having a first, open position, wherein the target engagement face is held away from the retainer and a second, closed position, in which the target engagement face is moved close to the retainer; and
a biasing element engaging the mounting frame to selectively bias the target engagement face in the first, open position, and the second, closed position; and
wherein the retainer includes a hole or slot and wherein the target engagement face further comprises at least one projection which extends into the hole or slot in the retainer.

2. A target clamp for holding targets comprising:
a retainer;
a mounting frame:
a target engagement face connected to the mounting frame, the target engagement face further comprising an extension on the target engagement face, the extension extending outwardly about 90 degrees from the target engagement face;
the mounting frame and target engagement face being pivotably movable and selectively disposable adjacent the retainer, the target clamp having a first, open position, wherein the target engagement face is held away from the retainer and a second, closed position, in which the target engagement face is moved close to the retainer; and
a biasing element engaging the mounting frame to selectively bias the target engagement face in the first, open position, and the second, closed position; and
wherein the retainer further comprises an opening through which the extension extends, and wherein the opening has at least one end for limiting movement of the extension.

3. The target clamp of claim 2, wherein the target engagement face pivots between about 20 to around 40 degrees between the first, open position, and the second, closed position.

4. The target clamp of claim 1, wherein the target engagement face comprises at least one projection having one or more teeth to engage a target.

5. A target system comprising:
a target clamp for holding targets comprising:
a retainer;
a mounting frame:
a target engagement face connected to the mounting frame, the target engagement face further comprises an extension on the target engagement face, the extension extending outwardly about 90 degrees from the target engagement face;
the mounting frame and target engagement face being pivotably movable and selectively disposable adjacent the retainer, the target clamp having a first, open position, wherein the target engagement face is held away from the retainer and a second, closed position, in which the target engagement face is moved close to the retainer; and
a biasing element engaging the mounting frame to selectively bias the target engagement face in the first, open position, and the second, closed position; and
wherein the retainer further comprises an opening through which the extension extends, and wherein the opening has at least one end for limiting movement of the extension and wherein the retainer includes a hole or slot and wherein the target engagement face further comprises at least one projection which extends into the hole or slot in retainer; and;
a target disposed on a target backer, the target backer having a recess, and wherein the at least one projection of the target clamp comprises a projection inserted into the recess in the target backer.

6. The target clamp of claim 1, further comprising a locking lever pivotably attached to the mounting frame.

7. The target clamp of claim 6, wherein the locking lever has a first, locking position, wherein the locking lever prevents movement of the target engagement face away from the retainer and a second, unlocked position, wherein the locking lever does not prevent movement of the target engagement face away from the retainer.

8. The target clamp of claim 6, further comprising a pivot arm, the pivot arm being attached at one end to the locking lever and attached at an opposing end to a base.

9. The target clamp of claim 1, wherein the target engagement face is at an angle of between 20 and 30 degrees relative to the retainer at the first, open position, and wherein the target engagement face is substantially parallel to the retainer in a second, closed position.

10. The target clamp of claim 9, further comprising a locking lever to limit rotation of the target engagement face relative to the retainer in the second, closed position.

11. The clamping system of claim 5, wherein the at least one projection is disposed below and spaced apart from the extension.

12. The clamping system of claim 1, wherein the retainer is part of a base and wherein the mounting frame is pivotably connected to the base and pivots about a pivot point, and wherein the biasing element is attached to the mounting frame such that at least a portion of the biasing element is on one side of the pivot point when the target engagement face is in the first, open position such that the biasing element applies a force to the mounting frame which biases the target engagement face into the first, open position, and wherein movement of target engagement face toward the second, closed position causes the biasing element to move, such that at least a portion of the biasing element is on a second side of the pivot point when the target engagement face is in the second, closed position, such that the biasing element biases the target engagement face into the second, closed position.

* * * * *